US012717284B2

(12) United States Patent
Li et al.

(10) Patent No.: US 12,717,284 B2
(45) Date of Patent: Aug. 25, 2026

(54) BUTTON MECHANISM AND WEARABLE DEVICE INCLUDING THE SAME

(71) Applicant: GOERTEK INC., Weifang (CN)

(72) Inventors: Shupeng Li, Weifang (CN); Shumin Tan, Weifang (CN)

(73) Assignee: GOERTEK INC., Weifang (CN)

( * ) Notice: Subject to any disclaimer, the term of this patent is extended or adjusted under 35 U.S.C. 154(b) by 321 days.

(21) Appl. No.: 18/260,059

(22) PCT Filed: Nov. 17, 2021

(86) PCT No.: PCT/CN2021/131057
§ 371 (c)(1),
(2) Date: Jun. 30, 2023

(87) PCT Pub. No.: WO2022/142810
PCT Pub. Date: Jul. 7, 2022

(65) Prior Publication Data

US 2024/0061380 A1 Feb. 22, 2024

(30) Foreign Application Priority Data

Dec. 30, 2020 (CN) ......................... 202011621483.9

(51) Int. Cl.
*G04G 21/08* (2010.01)
*G04G 17/02* (2006.01)
(Continued)

(52) U.S. Cl.
CPC ............. *G04G 21/08* (2013.01); *G04G 17/02* (2013.01); *H01H 13/06* (2013.01); *H01H 13/14* (2013.01)

(58) Field of Classification Search
CPC ......... G04G 21/08; G04G 21/00; H01H 13/06
See application file for complete search history.

(56) References Cited

U.S. PATENT DOCUMENTS 4,816,671 A * 3/1989 Umemura ............ H03K 17/969
250/229
5,631,881 A * 5/1997 Pessey ................... G04C 3/001
368/290

(Continued)

FOREIGN PATENT DOCUMENTS

CN 1336037 A 2/2002
CN 101371176 A 2/2009

(Continued)

OTHER PUBLICATIONS

International Search Report from International Application No. PCT/CN2021/131057 mailed Jan. 29, 2022.

*Primary Examiner* — Sean Kayes
(74) *Attorney, Agent, or Firm* — Shih IP Law Group, PLLC

(57) ABSTRACT

A button mechanism and a wearable device including the same are disclosed. The button mechanism comprises a casing, an optical signal transmitting part and an optical signal receiving part connected to a controller are disposed in the casing; and a lever comprising a connecting part connected to the casing and a shielding part block or not block an optical signal to pass therethrough, wherein the shielding part is connected to the connecting part and the connecting part is an elastic material member that is elastically stretchable, so as to be restored the shielding part. When the shielding part is applied with a force to move to a predetermined position, the optical signal sent by the optical signal transmitting part is transmitted to the optical signal receiving part; and when the shielding part is restored, the shielding part blocks the optical signal from the optical signal transmitting part.

7 Claims, 2 Drawing Sheets

(51) Int. Cl.
*H01H 13/06* (2006.01)
*H01H 13/14* (2006.01)

(56) References Cited

U.S. PATENT DOCUMENTS

| | | | | |
|---|---|---|---|---|
| 6,809,661 | B1 * | 10/2004 | Badarneh | H01H 25/00 341/20 |
| 2014/0045547 | A1 * | 2/2014 | Singamsetty | H04B 1/38 455/552.1 |
| 2017/0038859 | A1 * | 2/2017 | Park | G06F 1/1684 |
| 2017/0060100 | A1 * | 3/2017 | Loi | G04G 9/0064 |
| 2017/0168591 | A1 * | 6/2017 | Chung | E05B 37/00 |
| 2018/0362698 | A1 * | 12/2018 | Joo | C08G 18/7678 |
| 2019/0214987 | A1 | 7/2019 | Wang et al. | |

FOREIGN PATENT DOCUMENTS

| | | | |
|---|---|---|---|
| CN | 108962654 | A | 12/2018 |
| CN | 109036918 | A | 12/2018 |
| CN | 109088629 | A | 12/2018 |
| CN | 109302170 | A | 2/2019 |
| CN | 109859979 | A | 6/2019 |
| CN | 111463053 | A | 7/2020 |
| CN | 111524737 | A | 8/2020 |
| CN | 112820570 | A | 5/2021 |
| DE | 102017120353 | A1 | 3/2019 |

* cited by examiner

BUTTON MECHANISM AND WEARABLE DEVICE INCLUDING THE SAME

The disclosure claims a priority of a Chinese patent application No. 202011621483.9, titled "BUTTON MECHANISM AND WEARABLE DEVICE INCLUDING THE SAME" filed with China Patent Office on Dec. 30, 2020, the entire content of which has been incorporated herein by reference.

TECHNICAL FIELD

The disclosure relates to a technical field of an electronic device, and more specifically, to a button mechanism. In addition, the disclosure also relates to a wearable device including the button mechanism.

DESCRIPTION OF RELATED ART

A smart watch is a watch that has information processing capability and meets the basic technical requirement of the watch. The function thereof is similar to that of a personal digital assistant. In addition to a function of indicating time, it should also have one or more functions selected from reminder, navigation, calibration, monitoring and interaction etc., for example, it may be used as a compass, a pedometer, a touch screen, a global positioning system and a large-capacity storage device, etc. The display method thereof includes pointers, numbers, images, etc. Thus, there are more and more contents displayed on the screen, and the control of the screen display is mainly realized through the touch screen or rotation of a dial.

However, when the touch screen fails, for example, under water or in an environment with high humidity, it is impossible to touch the touch screen to act on the touch screen with a finger.

To sum up, how to realize the operation of the watch in the above environment is a problem to be solved urgently by those skilled in the art.

SUMMARY

In view of this, an object of the disclosure is to provide a button mechanism, which can realize an operation without touch screen, and can realize an operation under water or in a wet environment, and realize the operation more conveniently.

Another object of the disclosure is to provide a wearable device including the above button mechanism.

In order to achieve the above objects, the disclosure provides the following technical solutions:

A button mechanism, including:

a casing, in which an optical signal transmitting part and an optical signal receiving part are disposed, wherein the optical signal receiving part is connected to a controller; and a lever comprising a connecting part connected to the casing and a shielding part which is configured to block or not block an optical signal sent by the optical signal transmitting part, wherein the shielding part is connected to the connecting part and the connecting part is an elastic material member that is elastically stretchable, wherein when the shielding part is applied with a force to move to a predetermined position, the optical signal sent by the optical signal transmitting part is transmitted to the optical signal receiving part; and wherein when the shielding part is not applied with the force and restored to an initial position, the shielding part blocks the optical signal from the optical signal transmitting part.

Preferably, the connecting part is a component formed of TPU, the shielding part is formed of hard material, the connecting part is connected to the shielding part by double-shot injection molding, and the connecting part and the casing are coupled and sealed.

Preferably, the connecting part has a square structure, and the shielding part passes through the connecting part.

Preferably, the connecting part is smoothly connected to the casing.

Preferably, a part of the shielding part is located outside of the casing, and the part located outside of the casing is provided with an anti-skid texture.

Preferably, the shielding part is a component formed of ABS, and/or wherein the connecting part is coupled to the casing by ultrasonic welding.

Preferably, the shielding part is provided with a light passing hole, wherein when the shielding part is not applied with the force, the shielding part is located on a transmitting path of the optical signal to block the optical signal, and wherein when the shielding part is applied with the force to move to the predetermined position, the optical signal passes through the light passing hole.

Preferably, there are at least two optical signal transmitting parts and at least two optical signal receiving parts, and positions of the optical signal receiving parts are corresponding to positions of the optical signal transmitting parts respectively and the shielding part allows different optical signals to pass therethrough at different predetermined positions.

Preferably, two optical signal transmitting parts are respectively located on two sides of an axis of the lever, and the controller realizes different functions when the lever moves in two different directions.

A wearable device includes a button mechanism as described in any one of the above.

The lever in the button mechanism provided by the disclosure can move when it is applied with the force, and when the shielding part is moved to the predetermined position, a route between the optical signal transmitting part and the optical signal receiving part is not blocked, and the optical signal sent by the optical signal transmitting part can be transmitted to the optical signal receiving part, so that the optical signal receiving part sends a signal to the controller and the controller activates a corresponding function. Due to the use of the elastic connecting part, the elasticity can be ensured, thus it is convenient to move the shielding part, so as to activate the corresponding function of the controller, and the shielding part can be restored to the initial position after the force is removed. The disclosure also provides a wearable device including the above button mechanism.

BRIEF DESCRIPTION OF DRAWINGS

In order to more clearly illustrate the technical solutions in the embodiments of the disclosure or the prior art, the following will briefly introduce the drawings that need to be used in the description of the embodiments or the prior art. Obviously, the drawings in the following description are only a part of drawings of the disclosure. For those skilled in the art, other drawings can be obtained according to the provided drawings without creative work.

In FIGS. 1-2, reference numbers include:

1: lever, 11: connecting part, 12: shielding part, 121: light passing hole;

2: optical signal transmitting part, 21: first transmitting part, 22: second transmitting part;

3: optical signal receiving part, 31: first receiving part, 32: second receiving part.

DETAILED DESCRIPTIONS

Hereinafter, the technical solutions according the embodiments of the disclosure will be clearly and completely described with reference to the drawings in the embodiments of the disclosure. Apparently, the described embodiments are only some of the embodiments of the disclosure, not all of them. Based on the embodiments in this disclosure, all other embodiments obtained by those skilled in the art without making creative work belong to the scope of this disclosure.

A core of the disclosure is to provide a button mechanism, which can realize an operation without touch screen, and can realize an operation under water or in a wet environment, and realize the operation more conveniently.

Another core of the disclosure is to provide a wearable device including the button mechanism.

Figure 1:
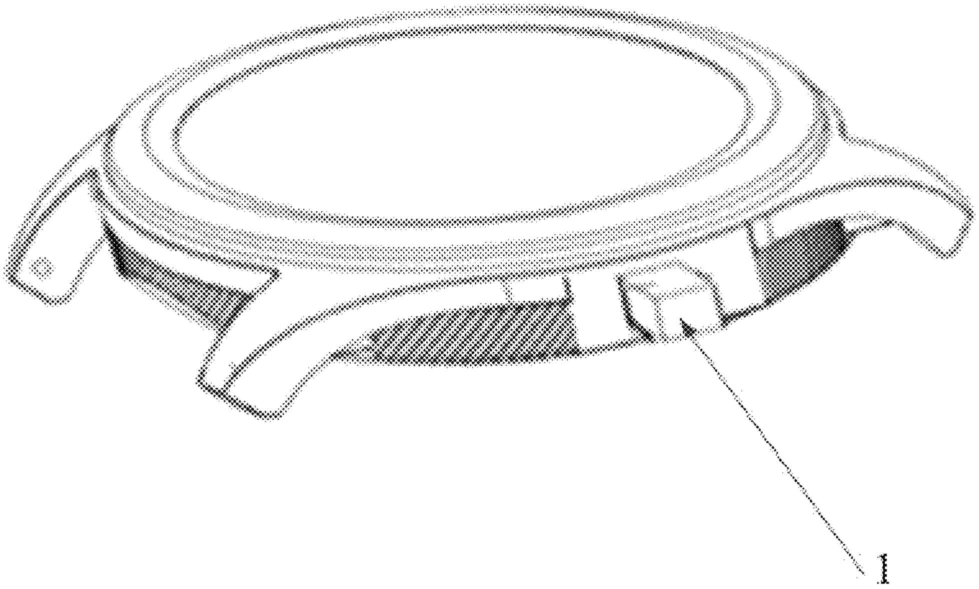
FIG. 1 is a schematic diagram of a wearable device provided by the disclosure.
Figure 2:
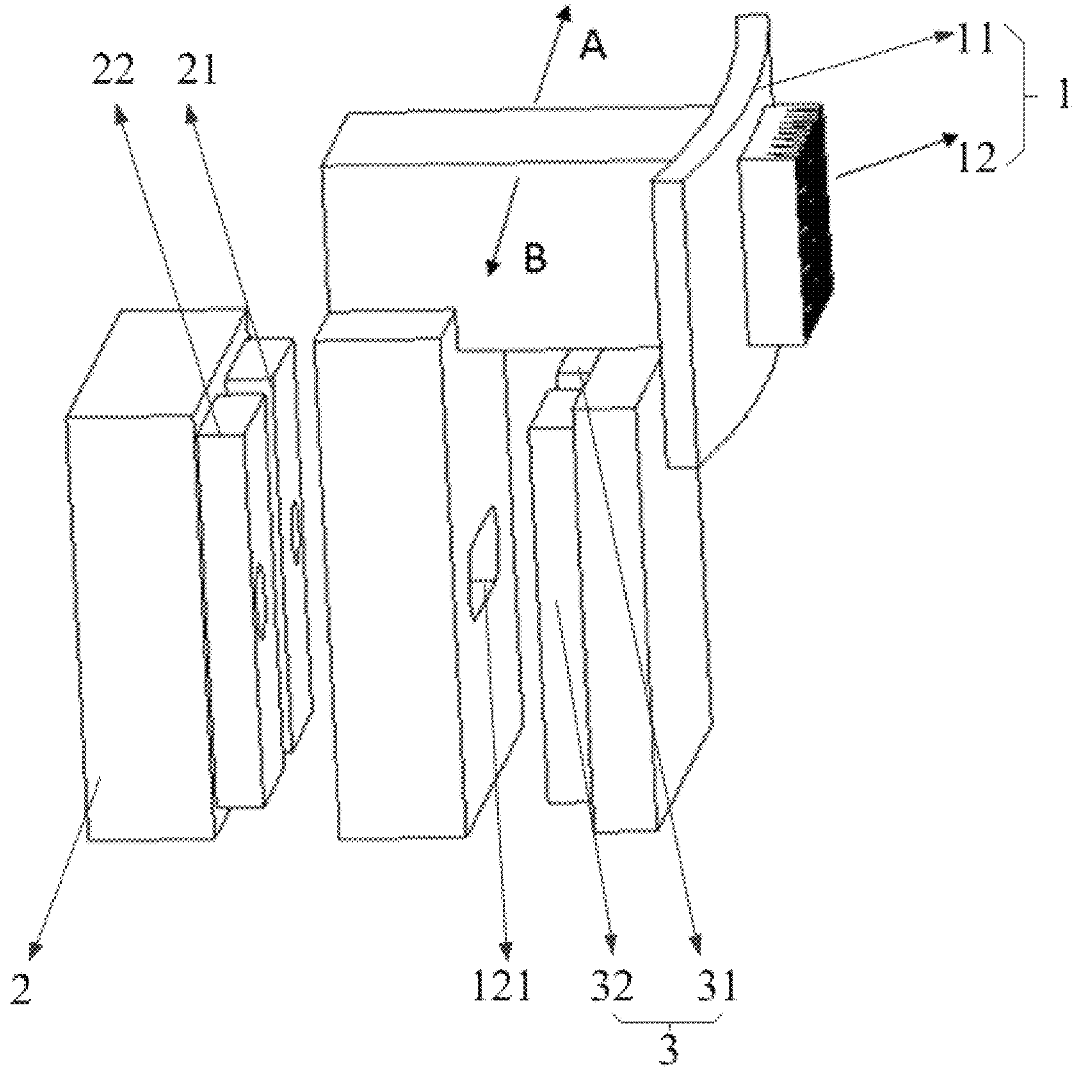
FIG. 2 is a schematic diagram of a button mechanism provided by the disclosure.

Please refer to FIGS. 1 to 2, FIG. 1 is a schematic diagram of a wearable device according to the disclosure; and FIG. 2 is a schematic diagram of a button mechanism according to the disclosure.

The disclosure provides a button mechanism, which is mainly used in a wearable device such as a watch and a bracelet. The button mechanism comprises a casing, and an optical signal transmitting part 2, an optical signal receiving part 3 and a lever 1 disposed inside the casing.

The lever 1 includes a connecting part 11 connected to the casing and a shielding part 12, the shielding part 12 is configured to block or not block an optical signal sent by the optical signal transmitting part 2. The shielding part 12 is connected to the connecting part 11, and the connecting part 11 is an elastic material member that is elastically stretchable, so as to be restored the shielding part 12 to an initial position.

When the shielding part 12 is applied with a force to move to a predetermined position, the optical signal sent by the optical signal transmitting part 2 is transmitted to the optical signal receiving part 3.

When the force applied to the shielding part 12 is removed and the shielding part 12 is restored to the initial position, or when the shielding part 12 is not applied with the force and it is in a restore state, the shielding part 12 blocks the optical signal from the optical signal transmitting part 2.

In the above mechanism, the connecting part 11 is connected to the casing and has a certain capability of elastically stretchable. It can be made of an elastic material, so that the shielding part 12 connected thereto can move relative to the casing. The blocking part 12 can be moved to the predetermined position when applied the force. When it is in this position, the optical signal sent by the optical signal transmitting part 2 can be transmitted to the optical signal receiving part 3, and the optical signal receiving part 3 can send a signal to a controller after receiving the optical signal, so as to activate the function.

The lever 1 in the button mechanism provided by the disclosure can move when it is applied with the force, and when the shielding part 12 is moved to the predetermined position, a route between the optical signal transmitting part 2 and the optical signal receiving part 3 is not blocked, and the optical signal sent by the optical signal transmitting part 2 can be transmitted to the optical signal receiving part 3, so that the optical signal receiving part 3 sends a signal to the controller, and the controller activates the corresponding function. Due to the use of the elastic connecting part 11, the elasticity can be ensured, thus it is convenient to move the shielding part 12, so as to activate the corresponding function of the controller, and the shielding part 12 can be restored to the initial position after the force is removed.

On the basis of the above-mentioned embodiments, the connecting part 11 is a component formed of TPU, the shielding part 12 is formed of hard material, and the connecting part 11 and the casing are coupled and sealed. It should be noted that, the TPU component is a thermoplastic polyurethane elastomer rubber component, and the TPU material has good characteristics such as high tension, high tensile force, toughness and aging resistance.

It should be noted that, the TPU component has a certain function of elastically stretchable, thus it is convenient to move the hard shielding part 12 when applied with the force. Please refer to FIG. 2, when the lever 1 is applied with the force to move in a direction A or B, the connecting part 11 is stretchable, so that the shielding part 12 can be moved. In addition, since the TPU component is an elastic component, the shielding part 12 can automatically return to the initial position by the connecting part 11 after the force is removed. The elastic member can improve the durability of the lever 1 and avoid the situation that it cannot be restored after using for a period.

The connecting part 11 and the shielding part 12 can be integrally formed, specifically, can be integrally formed by double-shot injection molding.

Double-shot injection molding is a manufacturing method that can connect structures with two kinds of materials, and can be used to fixedly connect two parts with different hardness. The lever 1 in the disclosure includes the connecting part 11 for connecting the casing and the shielding part 12, the connecting part 11 has a soft structure, and the shielding part 12 has a relatively harder structure. The elastically stretchable of the connecting part 11 provides the possibility for the movement of the shielding part 12. At the same time, since they are formed by double-shot injection molding, tightness therebetween can be ensured.

In order to further realize the tightness of the structure, the connecting part 11 and the casing are also sealed and connected, and the sealing of the two parts can prevent the moisture outside the mechanism from entering the inside of the casing, and avoid affecting the operation of the electronic components in the casing.

Please refer to FIG. 2, the connecting part 11 has a square structure, and the shielding part 12 passes through the connecting part 11.

It should be noted that in order to ensure the sealing and tightness, etc., of the structure, the corresponding positions of the connecting part 11 and the shielding part 12 passing therethrough are hermetically connected such as by the above double-shot injection molding and therefore, the connecting position therebetween becomes the passing position of the connecting part 11.

The shielding part 12 in FIG. 2 has a first structural block and a second structural block. The first structural block passes through the connecting part 11 to form a state that a part thereof is outside the casing and another part thereof is inside the casing, and the part inside the casing is connected to the second structural block. The second structural block may be provided with a light passing hole or a slit to facilitate the optical signal passing therethrough. Here, the first structural block and the second structural block can be disposed vertically to each other.

In order to improve the stability of the structure and avoid unevenness, the connecting part 11 is smoothly connected to the casing.

Optionally, a part of the shielding part 12 is located outside of the casing, and the part outside of the casing is provided with an anti-skid texture. The anti-skid texture can stabilize the action of the pressing or pulling force on the driving lever 1, and avoid skidding.

On the basis of any one of the above embodiments, specially, the shielding part 12 is a component formed of ABS. It should be noted that the ABS component is specifically an ABS plastic component, and the ABS plastic is terpolymer of three monomers of acrylonitrile (A), butadiene (B) and styrene (S). The ABS component can provide strong hardness, and when the force is applied to the outer surface, it can facilitate the transmission of force, so that the part inside the casing can move correspondingly.

On the basis of any one of the above embodiments, the connecting part 11 is connected to the casing by ultrasonic welding. The ultrasonic welding can form a stable connection, and at the same time, the two can form into one body relatively completely, which improves the durability of the lever 1 in use.

In a specific embodiment, the shielding part 12 is provided with a light passing hole 121. When the shielding part 12 is not applied with the force the shielding part 12 is located on a transmitting path of the optical signal, and the light passing hole 121 is misaligned with the transmitting path of the optical signal, so that the shielding part 12 blocks the optical signal, and when the blocking part 12 is applied with the force to move to the predetermined position, the optical signal passes through the light passing hole 121.

It should be noted that the light passing hole 121 may have a hole structure such as a circular hole or a square hole, or other slit, groove, etc. by which the optical signal can transmit therethrough. The light passing hole 121 is disposed in the shielding part 12, and when no force applied on the shielding part 12, the physical structure on the shielding part 12 directly blocks the signal from the optical signal transmitting part 2 to the optical signal receiving part 3, so that the optical signal receiving part 3 cannot obtain the optical signal and thus cannot send the signal to the controller.

Of course, the shielding part 12 can also be located at a position allowing optical signal to pass therethrough without the force, and the optical signal is not allowed to pass therethrough when it moves to the predetermined position under the force. The above selection can be made according to specific situations.

On the basis of the above-mentioned embodiments, the number of the optical signal transmitting part 2 and the number of the optical signal receiving part 3 may be not only one, and can be multiple groups respectively, that is, when the lever 1 is in different positions, the corresponding optical signals of the optical signal transmitting part 2 and the optical signal receiving part 3 of the different groups can be allowed.

Specifically, there are at least two optical signal transmitting parts 2 and at least two optical signal receiving parts 3, and the positions of the optical signal receiving parts 3 are corresponding to the positions of the optical signal transmitting parts 2 respectively, and when the shielding part 12 is located at different predetermined positions, different optical signals are allowed to pass therethrough, respectively.

Please refer to FIG. 2, two optical signal transmitting parts 2 are disposed in the casing, including a first transmitting part 21 and a second transmitting part 22, and two optical signal receiving parts 3 are also disposed in the casing, including a first receiving part 31 and a second receiving part 32. The first receiving part 31 is located in the direction of the optical signal sent by the first transmitting part 21, and the second receiving part 32 is located in the direction of the optical signal sent by the second transmitting part 22. When the lever 1 is not applied with the force, the optical signals sent by the first transmitting part 21 and the second transmitting part 22 are all blocked by the shielding part 12 and cannot pass through the light passing hole 121. When the lever 1 is applied with of the force to moves in the A direction to the predetermined position, the light passing hole 121 of the shielding part 12 is located in the direction of the optical signal of the first transmitting part 21, so that the optical signal can reach the first receiving part 31. When the lever 1 is applied with the force to moves in the B direction to the predetermined position, the light passing hole 121 of the shielding part 12 is located in the direction of the optical signal of the second transmitting part 22, so that the optical signal can reach the second receiving part 32.

It should be noted that, when the light passing hole 121 is at one position, the optical signal sent by only one of the first transmitting part 21 and the second transmitting part 22 can pass therethrough.

Optionally, the two optical signal transmitting parts 2 are respectively located on two sides of an axis of the lever 1, so that the lever 1 can move in two directions, thus the controller can realize different functions.

Since the TPU component is an elastic component, the connecting part 11 can automatically return to the initial middle position when the force is removed.

When in use, a force is applied to the lever 1 to make it moves in the direction A, and the light passing hole 121 moves between the first transmitting part 21 and the first receiving part 31, so that the optical signal from the first transmitting part 21 passes therethrough while blocking the optical signal from the second transmitting part 22. After receiving the optical signal from the first transmitting part 21, the first receiving part 31 activates a first function of the controller, such as turning up the page; and when the force is removed, the lever 1 returns to the initial position.

If a force is applied to the lever 1 to make it moves in the B direction, the light passing hole 121 moves between the second transmitting part 22 and the second receiving part 32, so that the optical signal from t the second transmitting part 22 passes therethrough while blocking the optical signal from the first transmitting part 21. After receiving the optical signal from the second transmitting part 22, the second receiving part 32 activates a second function of the controller, such as turning down the page; and when the force is removed, the lever 1 returns to the initial position.

The button mechanism provided by the disclosure can realize the control of the watch when the touch screen is not directly operated, and it is convenient to control the watch when the touch screen fails, especially under water or in an environment with high humidity, it can still realize the operation of the watch. Meanwhile, the operation is faster and more convenient than the operation of the button, and there will be no feeling of stuck.

In addition to the main structure and connection relationship of the button mechanism provided in the above embodiments, the disclosure also provides a wearable device including the button mechanism disclosed in the above embodiments.

The wearable device includes a main structure and the above-mentioned button mechanism, which can be used to apply the signal of the optical signal receiving part 3 to the control of the main structure.

Optionally, the wearable device includes a controller, wherein the optical signal receiving part 3 of the button mechanism is connected to the controller, and the controller is used to realize the control of the main structure according to the signal sent by the optical signal receiving part 3.

Optionally, the optical signal of the button mechanism is used to control the screen. Specifically, the lever 1 is a activate button for switching the screen. When the lever 1 moves, the controller receives the signal sent by the optical signal receiving part 3 to change the state of the screen and realize switch of the screen.

The above-mentioned wearable device may be a watch or a bracelet. Optionally, the above-mentioned button mechanism may also be used to control other functions of other wearable devices.

For the structures of other parts of the wearable device, please refer to the prior art, which will not be repeated herein.

Each embodiment in this specification is described in a progressive manner, each embodiment focuses on the difference from other embodiments, and the same and similar parts of each embodiment can be referred to each other.

The button mechanism and wearable device provided by the disclosure have been introduced in detail above. Herein, specific examples are used to illustrate the principles and implementation methods of the disclosure, and the descriptions of the above embodiments are only used to help understand the methods and core ideas of the disclosure. It should be pointed out that those skilled in the art can make some improvements and modifications to the disclosure without departing from the principles of the disclosure, and these improvements and modifications also fall within the protection scope of the claims of the disclosure.

What is claimed is:

1. A button mechanism, comprising:

a casing, in which optical signal transmitting parts and optical signal receiving parts are disposed, wherein the optical signal receiving part is connected to a controller; and a lever comprising a connecting part connected to the casing and a shielding part which is configured to block or not block an optical signal sent by the optical signal transmitting part, wherein the shielding part is connected to the connecting part and the connecting part is an elastic material member that is elastically stretchable, wherein when the shielding part is applied with a force to move to a predetermined position in a direction perpendicular to an axis direction of the lever, the optical signal sent by the optical signal transmitting part is transmitted to the optical signal receiving part, and wherein when the shielding part is not applied with the force and restored to an initial position, the shielding part blocks the optical signal from the optical signal transmitting part, wherein the shielding part is provided with a light passing hole, wherein when the shielding part is not applied with the force, the shielding part is located on a transmitting path of the optical signal to block the optical signal, wherein when the shielding part is applied with the force to move to the predetermined position, the optical signal passes through the light passing hole, wherein the optical signal transmitting parts comprise a first transmitting part and a second transmitting part, the optical signal receiving parts comprise a first receiving part and a second receiving part having positions corresponding to positions of the first transmitting part and the second transmitting part respectively, wherein the shielding part allows different optical signals to pass therethrough at different predetermined positions, and wherein the first transmitting part and the second transmitting part are respectively located on two sides in the axis direction of the lever, and the axis direction is the transmitting path of the optical signal of the shielding part when the shielding part is not applied with the force, when the lever moves in a first direction perpendicular to the axis direction of the lever, the light passing hole moves between the first transmitting part and the first receiving part, so that the optical signal from the first transmitting part passes therethrough while blocking the optical signal from the second transmitting part, the first receiving p receives the optical signal from the first transmitting part, a screen of a wearable device is switched up, when the lever moves in a second direction opposite to the first direction, the light passing hole moves between the second transmitting part and the second receiving part, so that the optical signal from the second transmitting part passes therethrough while blocking the optical signal from the fire transmitting part, the second receiving part receives the optical signal from the second transmitting part, the screen of the wearable device is switched down, and when the force is removed, the lever returns to the initial position.

2. The button mechanism according to claim 1, wherein the connecting part is a component formed of TPU (thermoplastic polyurethane), the shielding part is formed of material harder than the connecting part, and the connecting part and the casing are coupled and sealed to prevent moisture entering the casing.

3. The button mechanism according to claim 2, wherein the connecting part has a square structure, and the shielding part passes through the connecting part.

4. The button mechanism according to claim 2, wherein the connecting part is smoothly connected to the casing.

5. The button mechanism according to claim 2, wherein a part of the shielding part is located outside of the casing, and the part located outside of the casing is provided with an anti-skid texture.

6. The button mechanism according to claim 2, wherein the shielding part is a component formed of ABS (terpolymer of acrylonitrile, butadiene and styrene), and/or wherein the connecting part is coupled to the casing by ultrasonic welding.

7. A wearable device comprising a button mechanism according to claim 1.

* * * * *